Feb. 4, 1936.  O. CONRADTY  2,029,857
TROLLEY SYSTEM
Filed Oct. 25, 1933
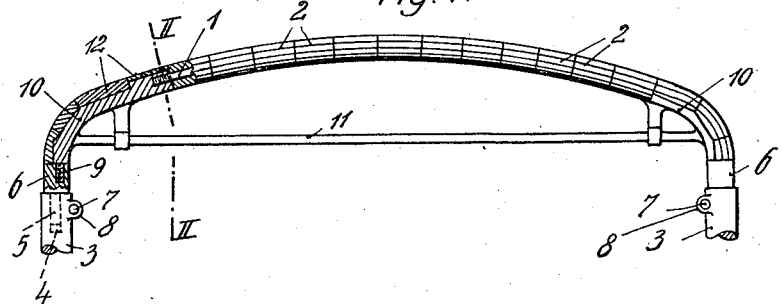
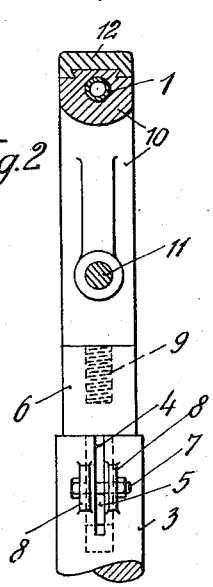
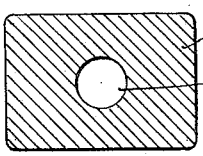
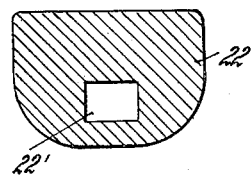
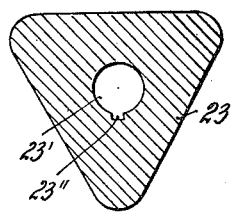
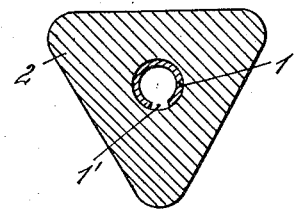
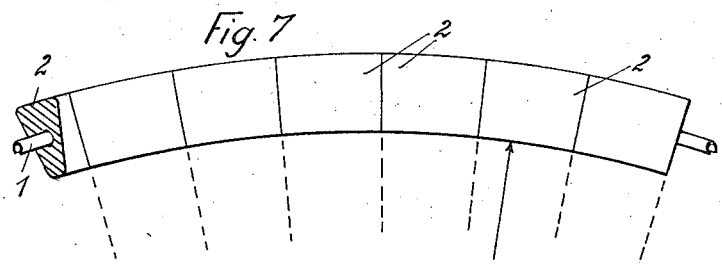
Inventor:
Ottman Conradty
By Pennie Davis Marvin & Edmonds
attorneys Patented Feb. 4, 1936

2,029,857

UNITED STATES PATENT OFFICE 2,029,857

TROLLEY SYSTEM

Ottmar Conradty, Nuremberg, Germany, assignor to C. Conradty, Nuremberg, Germany, a firm Application October 25, 1933, Serial No. 695,112 In Germany October 27, 1932

3 Claims. (Cl. 191—55)

My invention relates to improvements in trolley systems, and more particularly in systems of the type in which the current collecting member comprises a metal rod or pipe on which a carbon body or carbon bodies are mounted which slide on the conductor.

Heretofore in such collecting members the carbon body or bodies have been mounted on the metal member so that they cover the same only at one side, or so that a rod is passed through a bore of the said carbon body or bodies and the said body or bodies enclose the metal rod from all sides. Collecting members of the first named type in which the carbon body or bodies are fixed to one side of the member have been made in the form of an arch, while collecting members of the type in which the carbon body or bodies cover the rod from all sides have been made only in straight form. Collecting members of the type in which the carbon bodies are fixed to one side of the member only are objectionable for the reason that there is the possibility of the metal member sliding on the conductor, either when the trolley pole is reversed in position, or when the carbon body or bodies are worn. Collecting members of the straight type in which the carbon body or bodies enclose the metal rod are objectionable particularly in railway service, because such collecting members are subjected to heavy blows and high pressure exerted thereon by the line, the collecting member being frequently bent or broken. If the strength of the collecting member is increased so far that the collecting member is able to take up all the blows and the pressure exerted thereon, the thickness of the metal rod or pipe is such that the weight of the trolley pole is too high, and that the thickness of the carbon body or bodies is so small that the carbon body or bodies are rapidly worn.

The object of the improvements is to provide a trolley system of the type in which the carbon body or bodies envelop the metal rod of the collecting member from all sides, and in which the strength of the collecting member is sufficient to withstand even heavy strain, while the diameter of the metal rod or pipe is small. With this object in view my invention consists in constructing the collecting member, in which the metal rod is surrounded by the carbon body or bodies from all sides, in curved or arched form. Thereby I am enabled to provide a metal rod or pipe of comparatively small diameter even in case of high pressure, which rod would not be able to stand such pressure if it were made in straight form, because the pressure exerted on an arched rod may be much larger than the pressure exerted on a straight rod.

For the purpose of explaining the invention several examples embodying the same have been shown in the accompanying drawing in which the same reference characters have been used in all the views to indicate corresponding parts. In said drawing, Fig. 1 is an elevation partly in section showing the top part of the trolley pole and the collecting member thereof, Fig. 2 is a sectional elevation taken on the line 2—2 of Fig. 1, Figs. 3 to 5 are detail sectional elevations showing the carbon body, Fig. 6 is a similar sectional elevation showing a carbon body mounted on the metal pipe, and Fig. 7 is a fragmentary elevation on an enlarged scale showing a part of the collecting member.

In the examples shown hereinafter the collecting member comprises an arched metal pipe 1 on which a plurality of carbon bodies 2 are mounted, the pipe 1 being passed through holes made in the said bodies and being perfectly enveloped thereby. But I wish it to be understood that my invention is not limited to the construction shown in the figures, and that it may also be used in connection with collecting members having an integral carbon body mounted on the pipe or rod 1.

The trolley pole is in the form of a bail having two upwardly directed arms 3 slotted at their top ends and formed with sockets 4 in which bolts 5 of end pieces 6 are mounted, the said bolts being clamped in position by screws 7 passed through eyes 8. The end pieces 6 are formed with internally screw-threaded sockets 9 into which the screw-threaded ends of metal pieces 10 are screwed which are connected with each other by the arched pipe 1. Further, the said pieces 10 are connected with each other by a straight tension rod 11. On the pieces 10 carbon bodies 12 are mounted in the manner shown in Fig. 2.

The carbon bodies 2 may be made with different cross-sections. In Fig. 3 I have shown a carbon body 21 which is rectangular in cross-section, and which has a circular hole 21' through which the metal pipe 1 is passed. The carbon body 22 shown in Fig. 4 is similar in cross-section, but it is rounded at its lower corners, and it is formed with a rectangular bore 22'. The carbon body 23 shown in Fig. 5 is triangular in cross-section, and it is formed with a circular bore 23'. As shown the body is formed with a groove 23'' which is adapted to be engaged by a rib (not shown) formed on the metal pipe 1 for steadying the carbon body or bodies thereon.

Fig. 6 shows one way of mounting the carbon body 2 on the metal pipe 1. The metal pipe is formed with a longitudinal slot 1' and it has a resilient wall, so that it tightly places itself on the wall of the bore of the body 2.

The bodies 2 are in the form of segments, and their abutting end faces are in close contact with each other and intersect when extended in the centre T of the arch.

In a practical embodiment of the invention the length of the pipe 1 is five feet, and the rise of the arch is ¾ inch. I have found that a collector of this construction is able to withstand high pressure. Ordinarily the collecting member comprises a pipe 1 which is formed with a longitudinal slot, and which may have an outer diameter of ½ to ⅝ inch, the thickness of the carbon body or bodies being about two inches.

The pressure exerted by the line on the collecting member is in part transformed into axial thrust transmitted through the pipe 1, and the said axial thrust is taken up by the tension rod 11. Further, a part of the said axial thrust is transmitted through the carbon bodies 2 which are in contact with one another at their end faces, and which therefore act in a manner similar to the stones of an arch.

The collecting member combines high strength and low weight, which is particularly important in railway service, where at higher velocities a heavy collecting member is continuously thrown away from the line, and the electric current and the blows exerted by the high weight of the overhead line are high, so that a strong construction is necessary.

I claim:

1. A current-collector, comprising a standard-member, an upwardly arched collector-center-rod mounted on said member, said rod being longitudinally slitted to render it radially resilient, a carbon-contact member mounted on said rod, and means for tension-staying the ends of said rod toward each other.

2. In a current-collector of the character described, a trolley-pole in the form of a bail having two upwardly-directed arms, said arms being slotted at their upper ends, sockets thereat, end pieces having bolts therein fitting into said sockets, clamping means therefor, screw-threaded sockets in the end-pieces, shoe-pieces thereat having ends for screwing into said sockets, an arched, percussion-shock taking member connecting the distal ends of the end pieces, said member comprising a tubular structure smaller and lighter than in the conventional collector of the same size and service, and bearing carbon enclosing it on all sides, said carbon being thicker than in conventional collectors of the same size and service, and a horizontal tie-member connecting the other ends of the end-pieces.

3. In a current-collector of the character described, a trolley-pole in the form of a bail having two upwardly-directed arms, said arms being slotted at their upper ends, sockets thereat, end pieces having bolts therein fitting into said sockets, clamping means therefor, screw-threaded sockets in the end pieces, shoe-pieces thereat having ends for screwing into said sockets, an arched, percussion-shock taking member connecting the distal ends of the end pieces, said member comprising a tubular structure smaller and lighter than in the conventional collector of the same size and service, and bearing carbon enclosing it on all sides, said carbon being thicker than in conventional collectors of the same size and service, and a horizontal tie-member connecting the other ends of the end-pieces, said carbon consisting of separate keystoning-segments arranged to support each other, independently of the central tube, by a vault-action, the planes of the abutting faces of each segment intersecting in a common center, the entire end-surface of each end of each segment contacting fully that of the abutting one, whereby the said carbon segments, throughout the length of the collector, receive only compression and no flexure-strains, from the overhead current-conductor, and hence are substantially non-frangible under all service forces.

OTTMAR CONRADTY.